(12) United States Patent
Wang et al.

(10) Patent No.: US 10,959,247 B2
(45) Date of Patent: Mar. 23, 2021

(54) TRANSMISSION OF UPLINK CONTROL INFORMATION IN NEW RADIO

(71) Applicant: QUALCOMM Incorporated, San Diego, CA (US)

(72) Inventors: Renqiu Wang, San Diego, CA (US); Wanshi Chen, San Diego, CA (US); Peter Gaal, San Diego, CA (US); Joseph Binamira Soriaga, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/002,912

(22) Filed: Jun. 7, 2018

(65) Prior Publication Data

US 2019/0021102 A1 Jan. 17, 2019

Related U.S. Application Data

(60) Provisional application No. 62/517,090, filed on Jun. 8, 2017.

(51) Int. Cl.
*H04W 72/04* (2009.01)
*H04W 72/12* (2009.01)
(Continued)

(52) U.S. Cl.
CPC ....... *H04W 72/1242* (2013.01); *H04L 1/0026* (2013.01); *H04L 1/0031* (2013.01);
(Continued)

(58) Field of Classification Search
CPC . H04W 52/146; H04W 52/34; H04W 52/281; H04W 52/325; H04W 52/365;
(Continued)

(56) References Cited

U.S. PATENT DOCUMENTS

| 10,225,826 B2 * | 3/2019 | Tiirola | H04L 1/1861 |
| 2015/0003379 A1 * | 1/2015 | Han | H04L 1/1671 370/329 |

(Continued)

FOREIGN PATENT DOCUMENTS

EP 3223554 A1 9/2017

OTHER PUBLICATIONS

Huawei, et al., "On Transmission of PUSCH and UCI in the Same Slot," 3GPP Draft; R1-1704209, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017, XP051242361, 4 pages, Retrieved from the Internet: URL: http://www.3gpp.org/ftp/Meetings_3GPP_SYNC/RAN1/Docs/ [retrieved on Apr. 2, 2017].

(Continued)

*Primary Examiner* — Phuc H Tran
(74) *Attorney, Agent, or Firm* — Loza & Loza, LLP

(57) ABSTRACT

Aspects directed towards new radio (NR) transmissions of uplink control information (UCI) are disclosed. In a particular example, a priority is assigned to each of a plurality of UCI components such that the priority is assigned according to at least one of a type or payload size respectively associated with each of the plurality of UCI components. The plurality of UCI components are then transmitted based on the priority respectively assigned to each of the plurality of UCI components.

34 Claims, 12 Drawing Sheets

(51) Int. Cl.
    *H04L 1/00*     (2006.01)
    *H04L 1/16*     (2006.01)
    *H04L 5/00*     (2006.01)
    *H04W 52/32*    (2009.01)
    *H04W 52/34*    (2009.01)

(52) U.S. Cl.
    CPC .......... *H04L 1/0073* (2013.01); *H04L 1/1671* (2013.01); *H04L 5/0044* (2013.01); *H04L 5/0055* (2013.01); *H04W 72/0413* (2013.01); *H04W 72/0446* (2013.01); *H04W 72/1268* (2013.01); *H04L 5/001* (2013.01); *H04W 52/325* (2013.01); *H04W 52/346* (2013.01); *H04W 72/1284* (2013.01)

(58) Field of Classification Search
    CPC ............... H04W 52/367; H04W 52/58; H04W 72/0406; H04W 72/0413; H04W 72/0446; H04W 72/0453; H04W 88/02; H04W 52/346; H04W 72/1242; H04W 72/1268; H04W 72/1284; H04L 1/1671; H04L 1/18; H04L 1/1854; H04L 1/1861; H04L 27/2607; H04L 5/00; H04L 5/001; H04L 5/0055; H04L 5/14; H04L 1/0026; H04L 5/0044; H04L 5/0053
    See application file for complete search history.

(56)         References Cited

U.S. PATENT DOCUMENTS

| 2015/0341865 | A1* | 11/2015 | Yang ................... | H04W 52/146 |
|---|---|---|---|---|
|  |  |  |  | 455/522 |
| 2016/0183290 | A1* | 6/2016 | Ko ...................... | H04W 52/365 |
|  |  |  |  | 370/329 |
| 2016/0234788 | A1* | 8/2016 | Noh ...................... | H04W 52/34 |
| 2016/0353387 | A1* | 12/2016 | Gao .................... | H04W 52/146 |
| 2017/0006601 | A1* | 1/2017 | Seo ...................... | H04W 76/10 |
| 2017/0290008 | A1* | 10/2017 | Tooher ................. | H04L 1/0007 |
| 2019/0090258 | A1* | 3/2019 | Ryu .................... | H04B 7/0632 |
| 2020/0014517 | A1* | 1/2020 | Takeda ................. | H04L 5/0053 |
| 2020/0037298 | A1* | 1/2020 | Shi ..................... | H04W 72/0406 |

OTHER PUBLICATIONS

International Search Report and Written Opinion—PCT/US2018/036771—ISA/EPO—dated Sep. 11, 2018.

* cited by examiner

TRANSMISSION OF UPLINK CONTROL INFORMATION IN NEW RADIO

CROSS-REFERENCE TO RELATED APPLICATION(S)

This application claims priority to and the benefit of U.S. Provisional Patent Application No. 62/517,090, filed on Jun. 8, 2017, the entire content of which is incorporated herein by reference as if fully set forth below in its entirety and for all applicable purposes.

TECHNICAL FIELD

The technology discussed below relates generally to wireless communication systems, and more particularly, to new radio (NR) transmissions of uplink control information (UCI).

INTRODUCTION

As the demand for mobile broadband access continues to increase, research and development continue to advance wireless communication technologies not only to meet the growing demand for mobile broadband access, but to advance and enhance the user experience with mobile communications. New radio access technologies, such as 5G new radio (NR) access technology, promise to make wireless broadband indistinguishable from wireline with fiber-like performance at a significantly lower cost-per-bit.

In NR, uplink control information (UCI) and/or data may be transmitted via uplink (UL) short bursts. For instance, acknowledgment (ACK) bits may be transmitted via UL short bursts of one or two symbols. UCI payloads are often quite large, however, thus requiring more than two symbols. With respect to reporting Channel State Information (CSI), for instance, payloads may be in the order of a dozen bits per component carrier (CC) for periodic CSI reporting, and in the order of a hundred bits per CC for aperiodic CSI reporting. Other factors that may yield larger payloads include whether a multiple CC scheme is used (e.g., 32 bits per CC in LTE), as well as the particular encoding scheme that is used (e.g., when encoding UCI with polar code, the output bits can be up to 1024 bits).

Various techniques for transmitting large UCI payloads currently exist. For instance, such techniques include reducing the number of concurrent CCs in a CSI report (e.g., five CCs for sub-6 GHz spectrum bands, and ten CCs for millimeter wave spectrum bands), encoding with low-density parity-check (LDPC) code (i.e., transmitted on PUSCH), and segmenting the payload into multiple code blocks encoded in polar. However, these techniques, may not be practical or sufficient for NR. Accordingly, it would be desirable to provide techniques for transmitting large UCI payloads in NR that are both reliable and efficient.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards a scheduled entity (e.g., a user equipment (UE)) are disclosed. In one example, a method is disclosed, which includes assigning a priority to each of a plurality of uplink control information (UCI) components such that the priority is assigned according to at least one of a type or payload size respectively associated with each of the plurality of UCI components. The method further includes transmitting the plurality of UCI components based on the priority respectively assigned to each of the plurality of UCI components.

In another aspect directed towards a scheduling entity, a wireless communication device is disclosed, which includes assigning circuitry and transmitting circuitry. For this example, the assigning circuitry is configured to assign a priority to each of a plurality of UCI components such that the priority is assigned according to at least one of a type or payload size respectively associated with each of the plurality of UCI components. The transmitting circuitry is then configured to transmit the plurality of UCI components based on the priority respectively assigned to each of the plurality of UCI components.

In a further aspect of the disclosure, a computer readable medium storing computer executable code is disclosed, which includes instructions for causing a processor to perform various acts. For this example, the acts include assigning a priority to each of a plurality of UCI components such that the priority is assigned according to at least one of a type or payload size respectively associated with each of the plurality of UCI components. The acts further include transmitting the plurality of UCI components based on the priority respectively assigned to each of the plurality of UCI components.

In yet another aspect of the disclosure, a wireless communication device is disclosed, which includes means for assigning and means for transmitting. For this example, the means for assigning is configured to assign a priority to each of a plurality of UCI components such that the priority is assigned according to at least one of a type or payload size respectively associated with each of the plurality of UCI components. The means for transmitting is then configured to transmit the plurality of UCI components based on the priority respectively assigned to each of the plurality of UCI components.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As will be discussed in more detail herein, the present disclosure includes aspects directed towards new radio (NR) transmissions of uplink control information (UCI). In a particular aspect, techniques for transmitting large UCI payloads are disclosed. For instance, when a size of the UCI payload exceeds a threshold size, it is contemplated that transmitting such a payload may comprise transmitting UCI components via multiple packets (e.g., multiple code blocks or in different slots). For example, a large UCI payload may be split into multiple code blocks similar to PUSCH through code segmentation. Each code block may be separately encoded with Polar code.

It is also contemplated that transmitting large UCI payloads may comprise reporting a higher number of component carriers when transmitting a higher priority UCI component relative to transmitting a lesser priority UCI component. Various aspects for transmitting UCI components according to UCI type are disclosed as well. For instance, it is contemplated that UCI components of a channel state information (CSI) type may be transmitted according to a lesser priority than UCI components of an acknowledgment (ACK) type and/or scheduling request (SR) type.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

OFDM: orthogonal frequency division multiplexing. An air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

Figure 1:
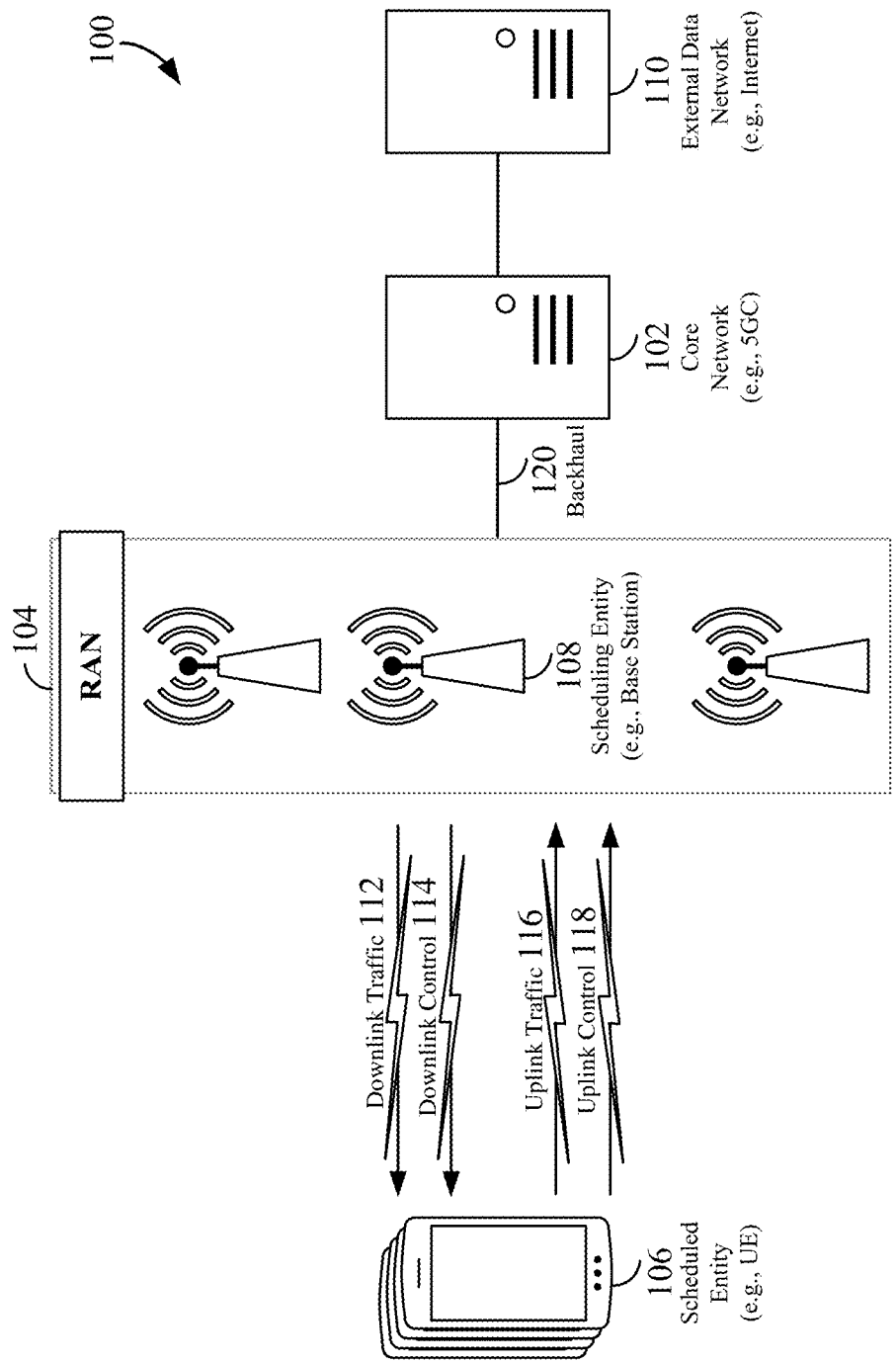
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
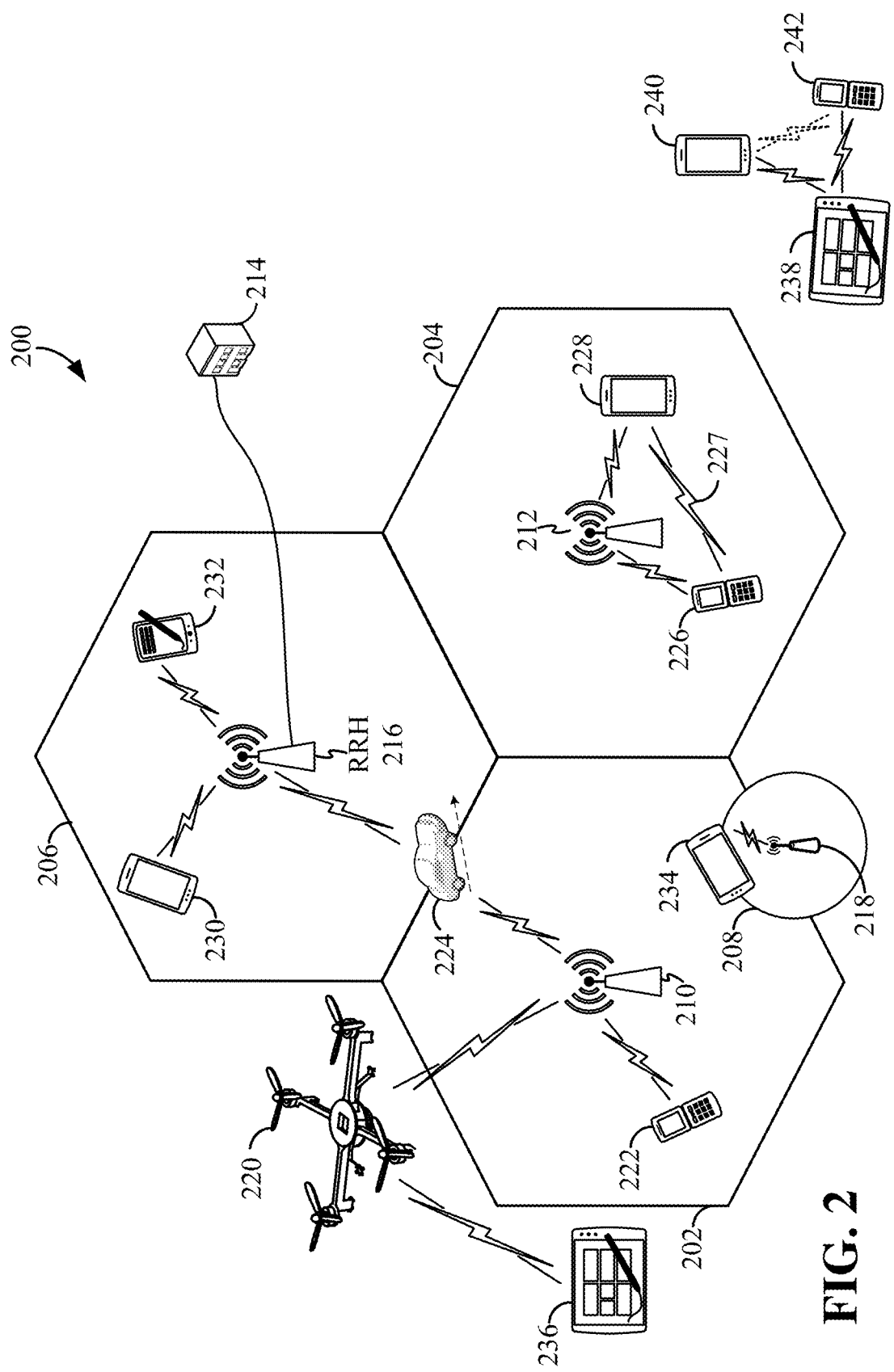
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
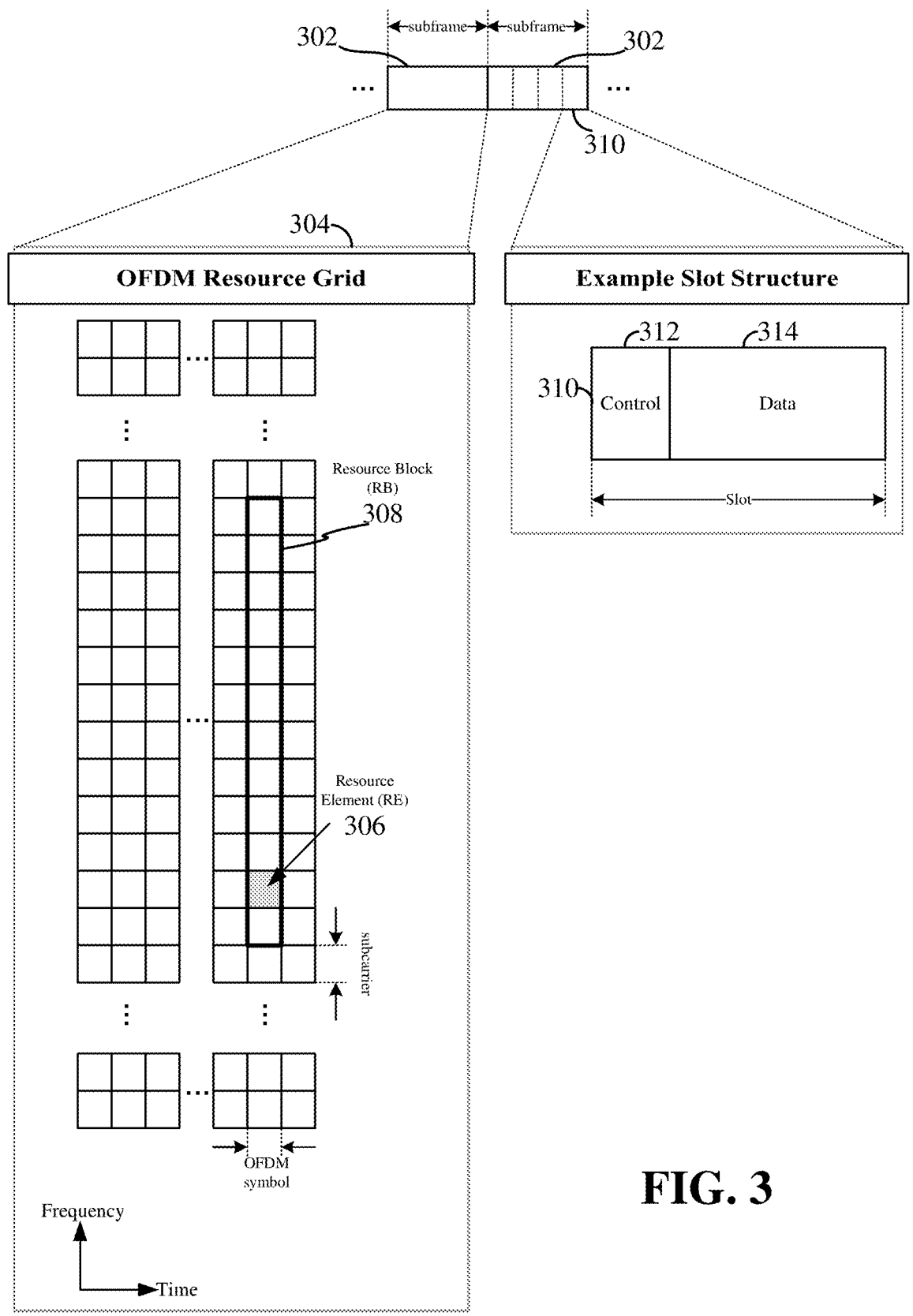
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
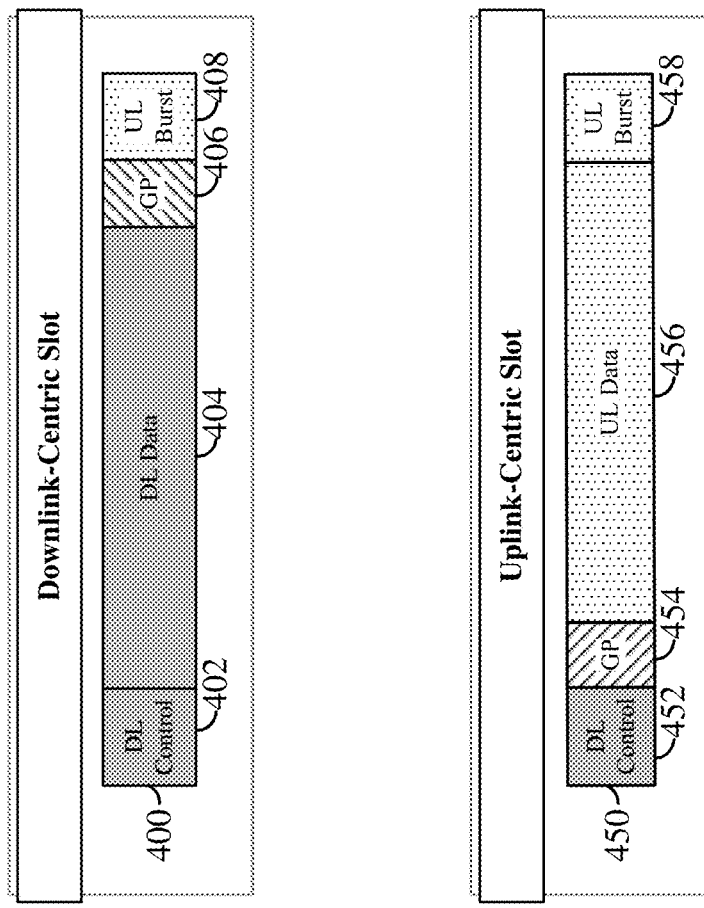
FIG. 4 is a schematic illustration of exemplary self-contained slots according to some aspects of the disclosure.

According to an aspect of the disclosure, one or more slots may be structured as self-contained slots. For example, FIG. 4 illustrates two example structures of self-contained slots 400 and 450. The self-contained slots 400 and/or 450 may be used, in some examples, in place of the slot 310 described above and illustrated in FIG. 3.

In the illustrated example, a DL-centric slot 400 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 450 may be a receiver-scheduled slot, wherein more resources are allocated for transmissions in the UL direction (e.g., transmissions from the scheduled entity 106 to the scheduling entity 108).

Each slot, such as the self-contained slots 400 and 450, may include transmit (Tx) and receive (Rx) portions. For example, in the DL-centric slot 400, the scheduling entity 202 first has an opportunity to transmit control information, e.g., on a PDCCH, in a DL control region 402, and then an opportunity to transmit DL user data or traffic, e.g., on a PDSCH in a DL data region 404. Following a guard period (GP) region 406 having a suitable duration 410, the scheduling entity 108 has an opportunity to receive UL data and/or UL feedback including any UL scheduling requests, CSF, a HARQ ACK/NACK, etc., in an UL burst 408 from other entities using the carrier. Here, a slot such as the DL-centric slot 400 may be referred to as a self-contained slot when all of the data carried in the data region 404 is scheduled in the control region 402 of the same slot; and further, when all of the data carried in the data region 404 is acknowledged (or at least has an opportunity to be acknowledged) in the UL burst 408 of the same slot. In this way, each self-contained slot may be considered a self-contained entity, not necessarily requiring any other slot to complete a scheduling-transmission-acknowledgment cycle for any given packet.

The GP region 406 may be included to accommodate variability in UL and DL timing. For example, latencies due to radio frequency (RF) antenna direction switching (e.g., from DL to UL) and transmission path latencies may cause the scheduled entity 204 to transmit early on the UL to match DL timing. Such early transmission may interfere with symbols received from the scheduling entity 108. Accordingly, the GP region 406 may allow an amount of time after the DL data region 404 to prevent interference, where the GP region 406 provides an appropriate amount of time for the scheduling entity 108 to switch its RF antenna direction, an appropriate amount of time for the over-the-air (OTA) transmission, and an appropriate amount of time for ACK processing by the scheduled entity.

Similarly, the UL-centric slot 450 may be configured as a self-contained slot. The UL-centric slot 450 is substantially similar to the DL-centric slot 400, including a guard period 454, an UL data region 456, and an UL burst region 458.

The slot structure illustrated in slots 400 and 450 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

Exemplary Transmission of Uplink Control Information

As previously discussed, aspects disclosed herein are directed towards new radio (NR) transmissions of uplink control information (UCI). In a particular aspect, techniques for transmitting large UCI payloads are disclosed. For instance, when a size of the UCI payload exceeds a threshold size, it is contemplated that transmitting such a payload may comprise transmitting UCI components via multiple packets (e.g., multiple code blocks or in different slots). For example, a large UCI payload may be split into multiple code blocks similar to PUSCH through code segmentation. Each code block may be separately encoded with Polar code.

It is also contemplated that transmitting large UCI payloads may comprise reporting a higher number of component carriers (CCs) when transmitting a higher priority UCI component relative to transmitting a lesser priority UCI component. For instance, with respect to transmitting channel state information (CSI), a CSI reporting scheme is contemplated that is dependent on CSI type and/or payload size. Within such implementation, CSI types and payload sizes are assigned different priorities, wherein a CSI deemed to be a higher priority may be associated with less restriction. For example, a higher priority CSI can be triggered in one trigger for up to 10 CCs, compared to 5 CCs for lesser priority CSI. It is thus contemplated that CSI reporting may comprise reporting a higher number of CCs (e.g., 10 CCs) for CSI types deemed to have a higher priority (e.g., a rank indicator (RI) type, a beam information type, etc.), and reporting a lesser number of CCs (e.g., 5 CCs) for CSI types deemed to have a lesser priority (e.g., a channel quality indicator (CQI) type, a precoding matrix indicator (PMI) type, etc.). Similarly, when prioritizing according to CSI payload size, it is contemplated that CSI reporting may comprise reporting a higher number of CCs (e.g., 10 CCs) for smaller CSI payload sizes which are deemed to have a higher priority (e.g., 50 bits of CSI per CC), and reporting a lesser number of CCs (e.g., 5 CCs) for larger CSI payload sizes deemed to have a lesser priority (e.g., 100 bits of CSI per CC).

Various aspects for transmitting particular UCI components together in a same slot are also contemplated. For instance, aspects are disclosed for separation of some CSI components, which are generally assigned a lesser priority, from UCI components, which are generally assigned a higher priority (e.g., acknowledgment (ACK), scheduling request (SR), and/or higher priority CSI components). The separation may be done with time division multiplexing and/or separate coding of the different UCI components with different priority. To this end, because jointly encoding/transmitting CSI with ACK and/or SR yields the same performance, it is noted that jointly encoding/transmitting CSI with ACK and/or SR may be appropriate when the performance target of the CSI is comparable with the performance targets of the ACK and/or SR, such as when the CSI is an RI or beam information. However, when the performance targets are different and the simultaneous transmission of CSI with an ACK and/or SR in a same slot is desired, a separate encoding of such components is contemplated. In some cases, the separately encoded UCI components may be time division multiplexed using different symbols to transmit. To this end, it is contemplated that such configurations may comprise determining whether the UCI components should be transmitted within an uplink short burst or long burst of the same slot.

Figure 5:
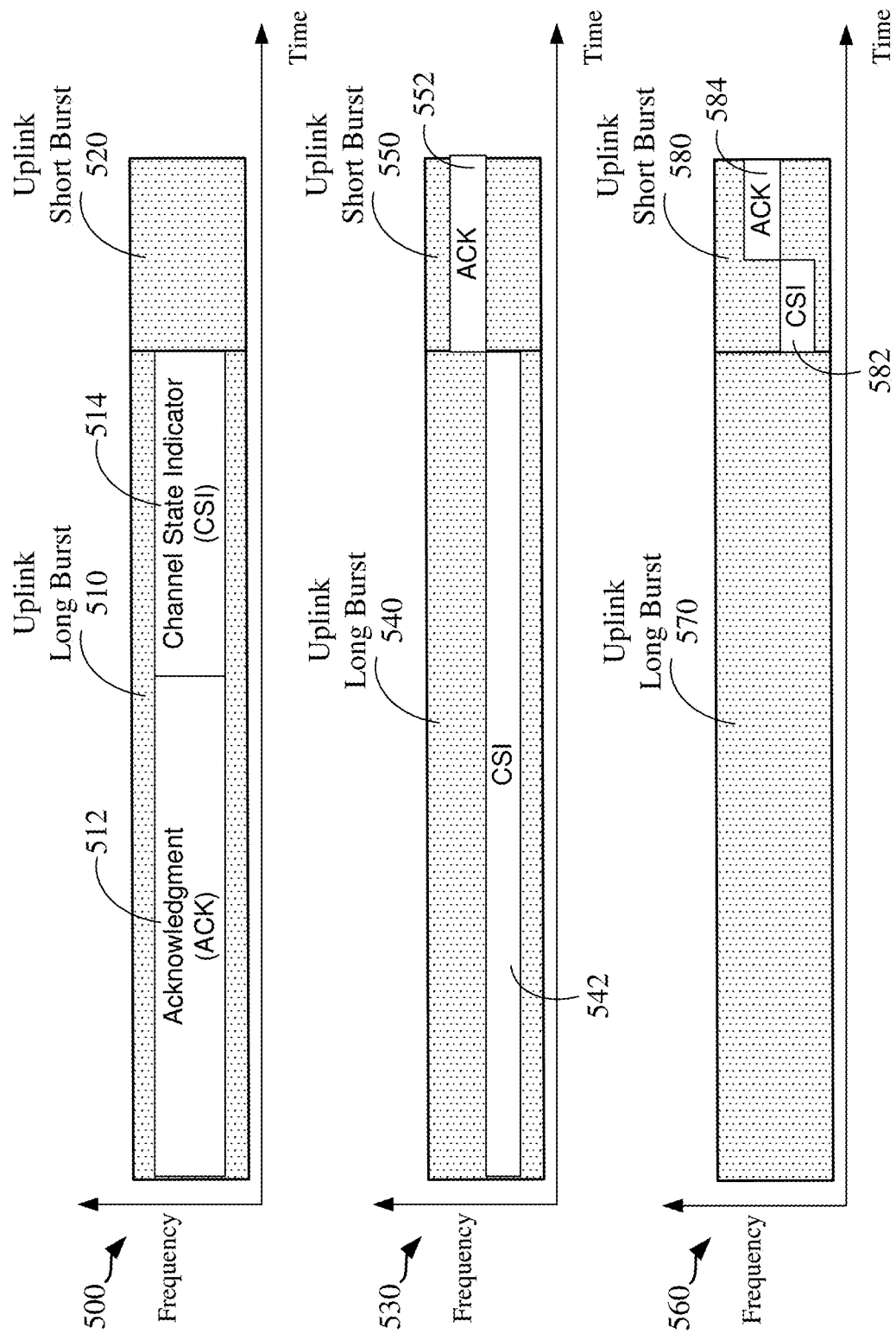
FIG. 5 illustrates exemplary slot structures for transmitting uplink control information (UCI) components in accordance with some aspects of the present disclosure.

Referring next to FIG. 5, exemplary slot structures are provided for transmitting UCI components within a same slot in accordance with some aspects of the present disclosure. As illustrated in FIG. 5, a first exemplary slot structure 500 comprises an uplink long burst 510 and an uplink short burst 520, wherein ACK resource elements 512 and CSI resource elements 514 are both included in the uplink long burst 510. Different performances for the ACK and CSI channel may be achieved by adjusting the number of resource elements assigned to each channel Within such implementation, if the ACK 512 is deemed a higher priority than the CSI 514 (e.g., where CSI 514 is a CQI type), more resource elements may be allocated for the ACK 512 than for the CSI 514. In some cases, more resource elements may be assigned to higher priority UCI components by assigning more symbols (e.g., 7 of 11 symbols allocated for ACK 512, and 4 of 11 symbols allocated for CSI 514). Also, in some cases, the assigned resource elements may not be sufficient to transmit the entire UCI payload, i.e., the resulted code rate may be higher than the maximum code rate configured by the gNB. In this case, some or all of the UCI payload may be dropped starting from the component with the least priority. Alternatively, as shown in exemplary slot structure 530, rather than transmitting both UCI components in a same long burst, a first UCI component (i.e., CSI 542) may be transmitted in an uplink long burst 540, whereas the second UCI component (i.e., ACK 552) may be transmitted in an uplink short burst 550. As illustrated in exemplary slot structure 560, implementations are also contemplated in which both UCI components (i.e., CSI 582 and ACK 584) are transmitted in a same uplink short burst 580, rather than in the uplink long burst 570.

In another scheme for transmitting UCI components in a same slot, a power control scheme is contemplated, wherein a first UCI component is assigned a higher priority than a second UCI component such that the first UCI component is transmitted with more power than the second UCI component. Here, it should be noted that a closed power control operation (e.g., based on ACK or SR as the reference) may be implemented, wherein CSI power control may be determined using the same closed power control loop, but with a CSI specific power offset.

Figure 6:
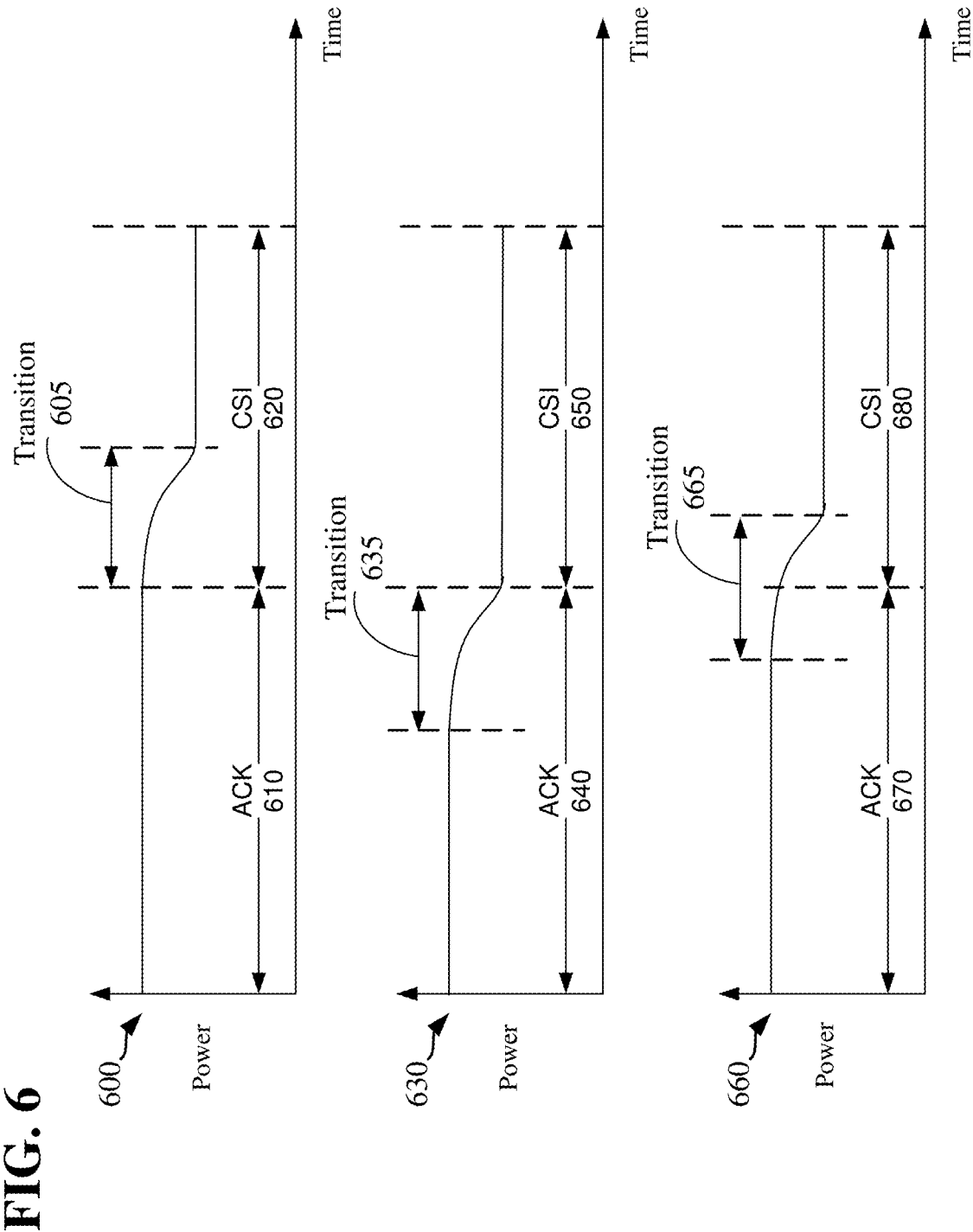
FIG. 6 illustrates exemplary power transitions for transmitting UCI components in accordance with some aspects of the present disclosure.

It should be further noted that the above power control design should take into account a transitional period for when a transmission power changes between adjacent symbols. In FIG. 6, for instance, exemplary power transitions are provided for transmitting an ACK within the same slot as a CSI, wherein the ACK is transmitted with more power than the CSI (e.g., where ACK transmission power is 3 dB greater than CSI transmission power). As illustrated, a first configuration 600 is provided in which the transition 605 is entirely within CSI 620, rather than ACK 610. Alternatively, as illustrated in configuration 630, the transition 635 is entirely within ACK 640, rather than CSI 650. As illustrated in configuration 660, implementations are also contemplated in which a first part of the transition 665 is included in the ACK 670, and a second part of the transition 665 is included in the CSI 680.

With respect to the each of the configurations 600, 630, and 660, illustrated in FIG. 6, it is noted that the respective transitions 600, 630, and 660 may occur when the ACK and CSI are time division multiplexed in a long burst, or from a long burst to a short burst. It should also be noted that particular configurations may be preferred, depending on the respective priorities (i.e., performance targets) of the UCI components being transmitted. For instance, since the performance target of an ACK is generally greater than the performance target of a CSI, it may be desirable to utilize configuration 600 to ensure that the last ACK symbols are transmitted at full power (i.e., so that the power transition occurs entirely within the lower priority channel). However, if the ACK and CSI have comparable performance targets (e.g., when the CSI is an RI or beam information), it may be desirable to utilize configuration 660 so that the transition is evenly split between the ACK and CSI.

In another aspect of the disclosure, it should be appreciated that the aforementioned power control scheme is not limited to UCI, but may also include other channels (e.g., Physical Uplink Shared Channel (PUSCH) and sounding reference signal (SRS)). Accordingly, in addition to the configurations 600, 630, and 660, illustrated in FIG. 6, various other configurations are contemplated. For instance, when placing the power transition in a lower priority channel, such configurations may include, placing the transition on the SRS (e.g., if the SRS is time division multiplexed (TDMd) with a CSI, ACK, or SR) or placing the transition on the PUSCH (e.g., if the PUSCH is TDMd with an ACK or SR). Additional configurations are also contemplated for evenly splitting the transition including, for example, evenly splitting the transition between the PUSCH and CSI (i.e., where the PUSCH and CSI are assigned comparable priorities).

Exemplary Scheduling Entity

Figure 7:
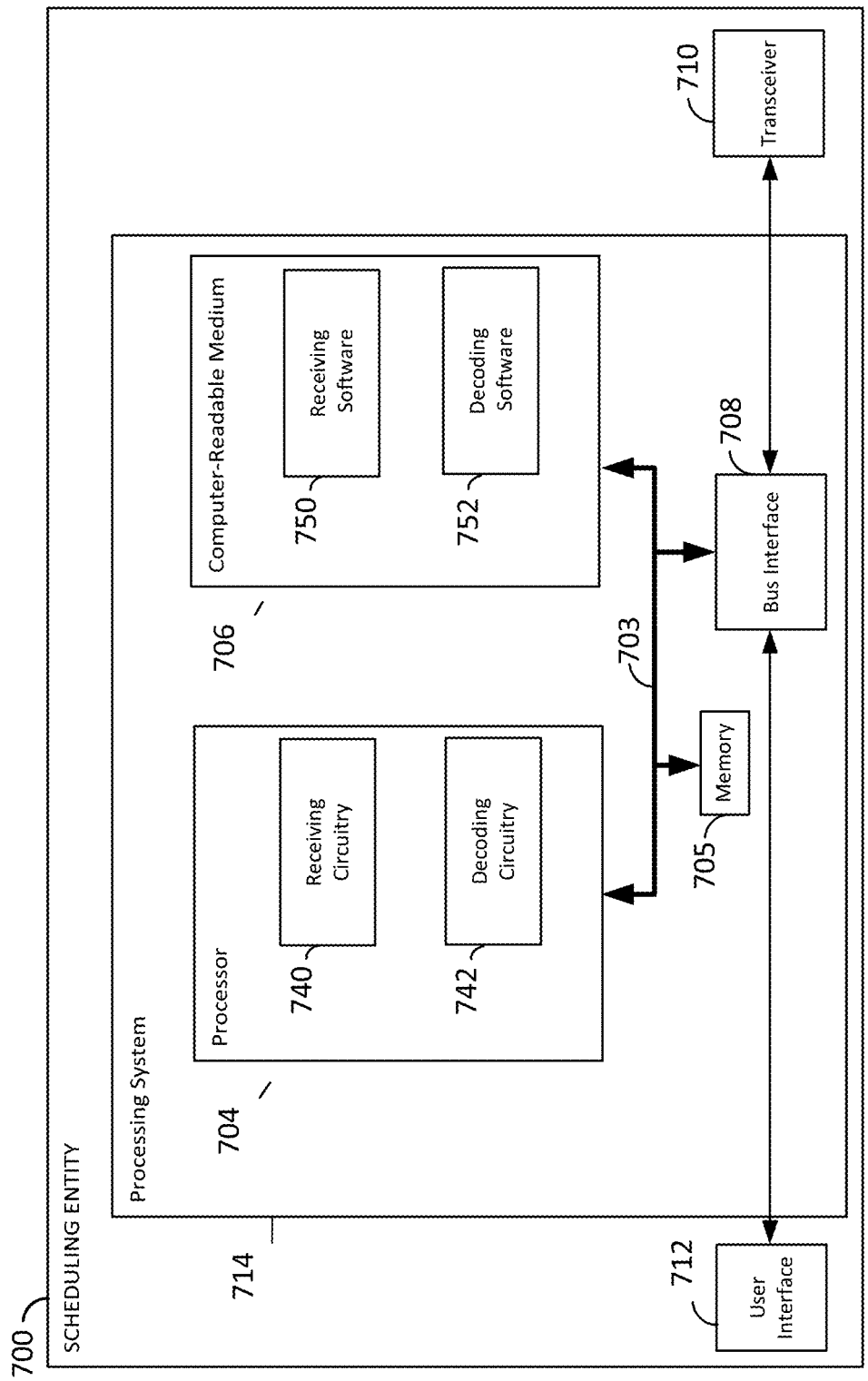
FIG. 7 is a block diagram illustrating an example of a hardware implementation for a scheduling entity employing a processing system.

FIG. 7 is a block diagram illustrating an example of a hardware implementation for a scheduling entity 700 employing a processing system 714. For example, the scheduling entity 700 may be a user equipment (UE) as illustrated in any one or more of the figures disclosed herein. In another example, the scheduling entity 700 may be a base station as also illustrated in any one or more of the figures disclosed herein.

The scheduling entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in a scheduling entity 700, may be used to implement any one or more of the processes and procedures described below and illustrated in FIG. 8.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided.

In some aspects of the disclosure, the processor 704 may include a receiving circuitry 740 configured for various functions, including, for example, to receive uplink control information (UCI) components transmitted by a scheduled entity (e.g., scheduled entity 900), wherein the UCI components are transmitted to the scheduling entity 700 based on a priority respectively assigned to each of the UCI components. Here, it is contemplated that priority is assigned by the scheduled entity (e.g., scheduled entity 900) according to at least one of a type or payload size respectively associated with each of the UCI components. As illustrated, the processor 704 may also include a decoding circuitry 742 configured for various functions. For instance, the decoding circuitry 742 may be configured to decode symbols received from a scheduled entity (e.g., scheduled entity 900) to ascertain the UCI encoded in such symbols. It should also be appreciated that, the combination of the receiving circuitry 740 and the decoding circuitry 742 may be configured to implement one or more of the functions described herein.

Referring back to the remaining components of scheduling entity 700, it should be appreciated that the processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may include receiving software 750 configured for various functions, including, for example, to receive UCI components transmitted by a scheduled entity (e.g., scheduled entity 900), wherein the UCI components are transmitted to the scheduling entity 700 based on a priority respectively assigned to each of the UCI components. Here, it is contemplated that priority is assigned by the scheduled entity (e.g., scheduled entity 900) according to at least one of a type or payload size respectively associated with each of the UCI components. As illustrated, the computer-readable storage medium 706 may also include decoding software 752 configured for various functions. For instance, the decoding software 752 may be configured to decode symbols received from a scheduled entity (e.g., scheduled entity 900) to ascertain the UCI encoded in such symbols.

In a particular configuration, it is also contemplated that the scheduling entity 700 includes means for receiving UCI components transmitted by a scheduled entity (e.g., scheduled entity 900), and means for decoding symbols corresponding to the UCI components. In one aspect, the aforementioned means may be the processor(s) 704 configured to perform the functions recited by the aforementioned means. In another aspect, the aforementioned means may be a circuit or any apparatus configured to perform the functions recited by the aforementioned means.

Figure 8:
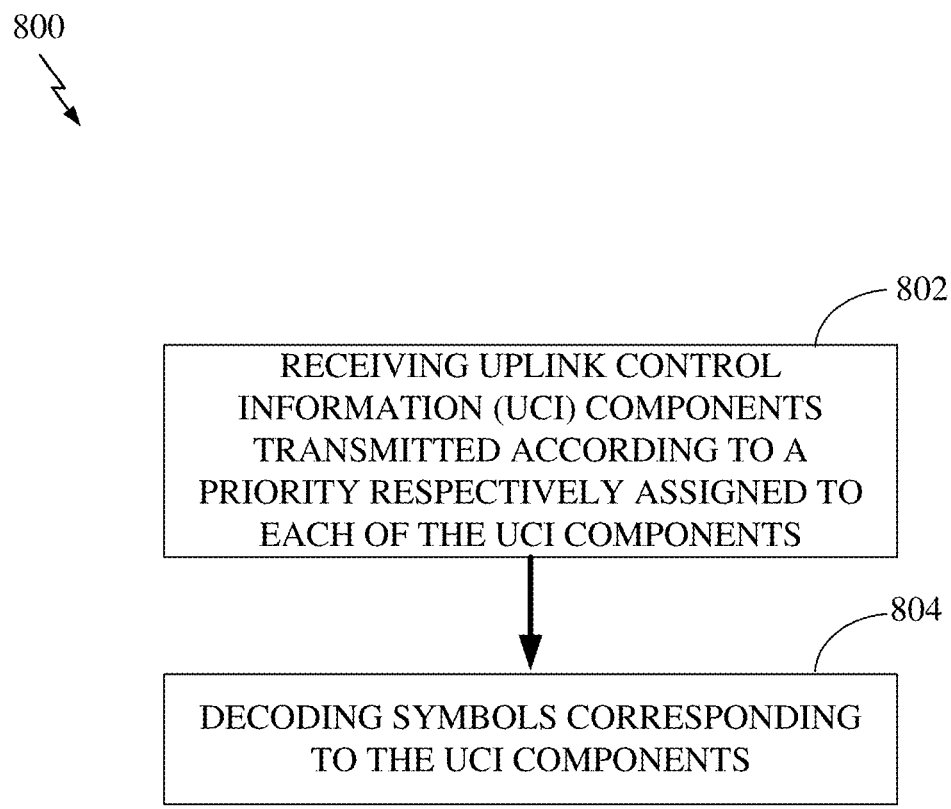
FIG. 8 is a flow chart illustrating an exemplary process for processing UCI components received in accordance with some aspects of the present disclosure.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described herein and utilizing, for example, the processes and/or algorithms described in relation to FIG. 8.

In FIG. 8, a flow chart is provided, which illustrates an exemplary scheduling entity process that facilitates some aspects of the disclosure. As described below, some or all illustrated features may be omitted in a particular implementation within the scope of the present disclosure, and some illustrated features may not be required for implementation of all embodiments. In some examples, the process 800 may be carried out by the scheduling entity 700 illustrated in FIG. 7. In some examples, the process 800 may be carried out by any suitable apparatus or means for carrying out the functions or algorithm described below.

Process 800 begins at block 802 with the scheduling entity 700 receiving UCI components transmitted according to a priority respectively assigned to each of the UCI components. Process 800 then concludes at block 804 where the scheduling entity 700 decodes symbols corresponding to the UCI components.

Exemplary Scheduled Entity

Figure 9:
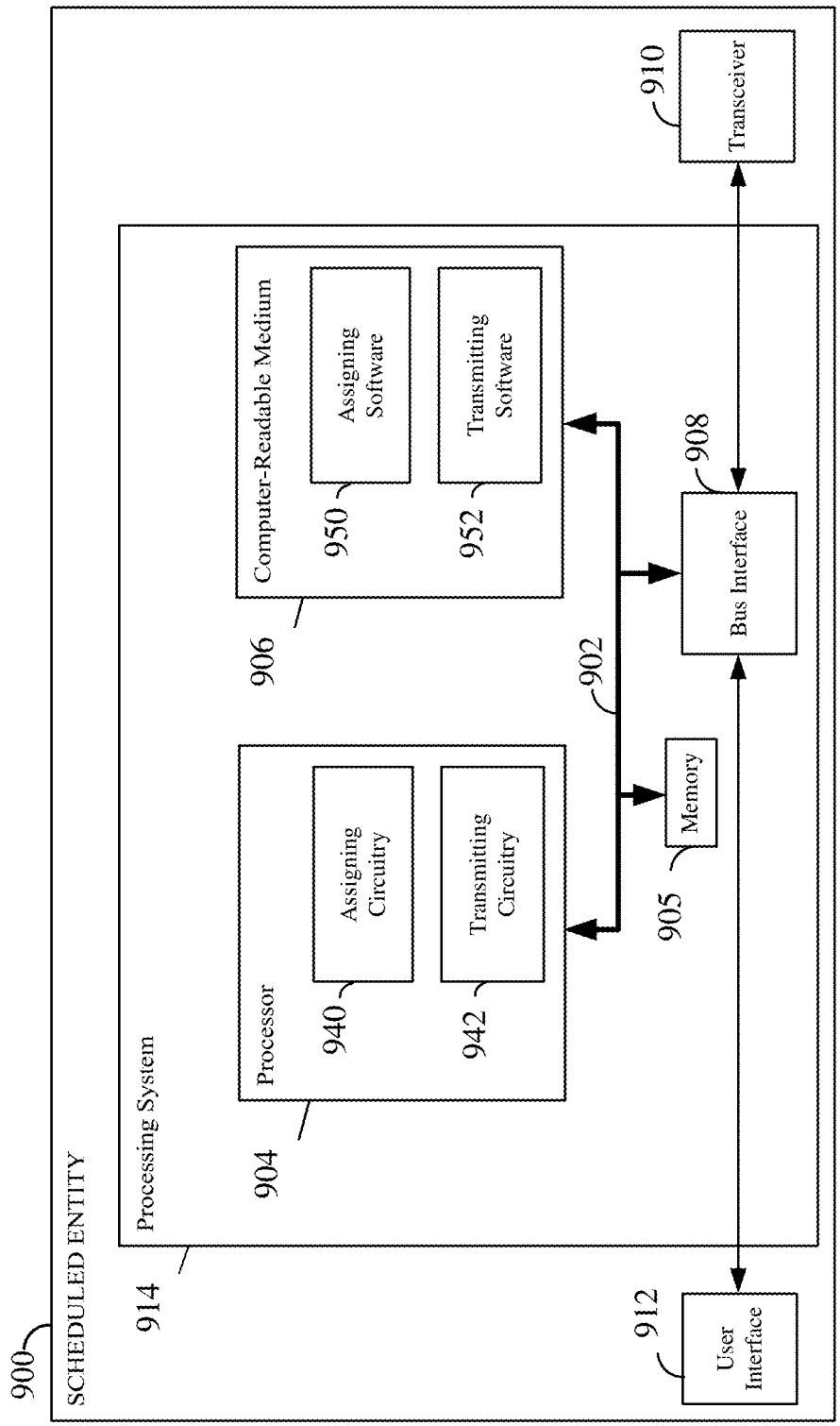
FIG. 9 is a block diagram illustrating an example of a hardware implementation for a scheduled entity employing a processing system.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of the FIGs. disclosed herein.

The processing system 914 may be substantially the same as the processing system 714 illustrated in FIG. 7, including a bus interface 908, a bus 902, memory 905, a processor 904, and a computer-readable medium 906. Furthermore, the scheduled entity 900 may include a user interface 912 and a transceiver 910 substantially similar to those described above in FIG. 7. That is, the processor 904, as utilized in a scheduled entity 900, may be used to implement any one or more of the processes described below and illustrated in the various figures.

In some aspects of the disclosure, the processor 904 may include an assigning circuitry 940 configured for various functions, including, for example, to assign a priority to each of a plurality of uplink control information (UCI) components. Here, it is contemplated that such priority is assigned according to at least one of a type or payload size respectively associated with each of the plurality of UCI components. As illustrated, the processor 904 may also include transmitting circuitry 942 configured for various functions. For instance, transmitting circuitry 942 may be configured to transmit the plurality of UCI components based on the priority respectively assigned to each of the plurality of UCI components. It should also be appreciated that, the combination of the assigning circuitry 940 and the transmitting circuitry 942 may be configured to implement one or more of the functions described herein.

Similar to processor 704, processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. Similar to computer-readable medium 706, computer-readable medium 906 may be a non-transitory computer-readable medium comprising characteristics that are substantially similar. The computer-readable medium 906 may reside in the processing system 914, external to the processing system 914, or distributed across multiple entities including the processing system 914. It should also be appreciated that, similar to computer-readable medium 706, computer-readable medium 906 may be embodied in a computer program product comprising characteristics that are substantially similar.

In one or more examples, the computer-readable storage medium 906 may include assigning software 950 configured for various functions, including, for example, to assign a priority to each of a plurality of UCI components. Here, it is again contemplated that such priority is assigned according to at least one of a type or payload size respectively associated with each of the plurality of UCI components. As illustrated, the computer-readable storage medium 906 may also include transmitting software 952 configured for various functions. For instance, transmitting software 952 may be configured to transmit the plurality of UCI components based on the priority respectively assigned to each of the plurality of UCI components. It should also be appreciated that, the combination of the assigning software 942 and the transmitting software 952 may be configured to implement one or more of the functions described herein.

In a particular configuration, it is also contemplated that the scheduled entity 900 includes means for assigning a priority to each of a plurality of UCI components, and means for transmitting the plurality of UCI components based on the priority respectively assigned to each of the plurality of UCI components. In one aspect, the aforementioned means may be the processor(s) 904 configured to perform the functions recited by the aforementioned means. In another aspect, the aforementioned means may be a circuit or any apparatus configured to perform the functions recited by the aforementioned means.

Figure 12:
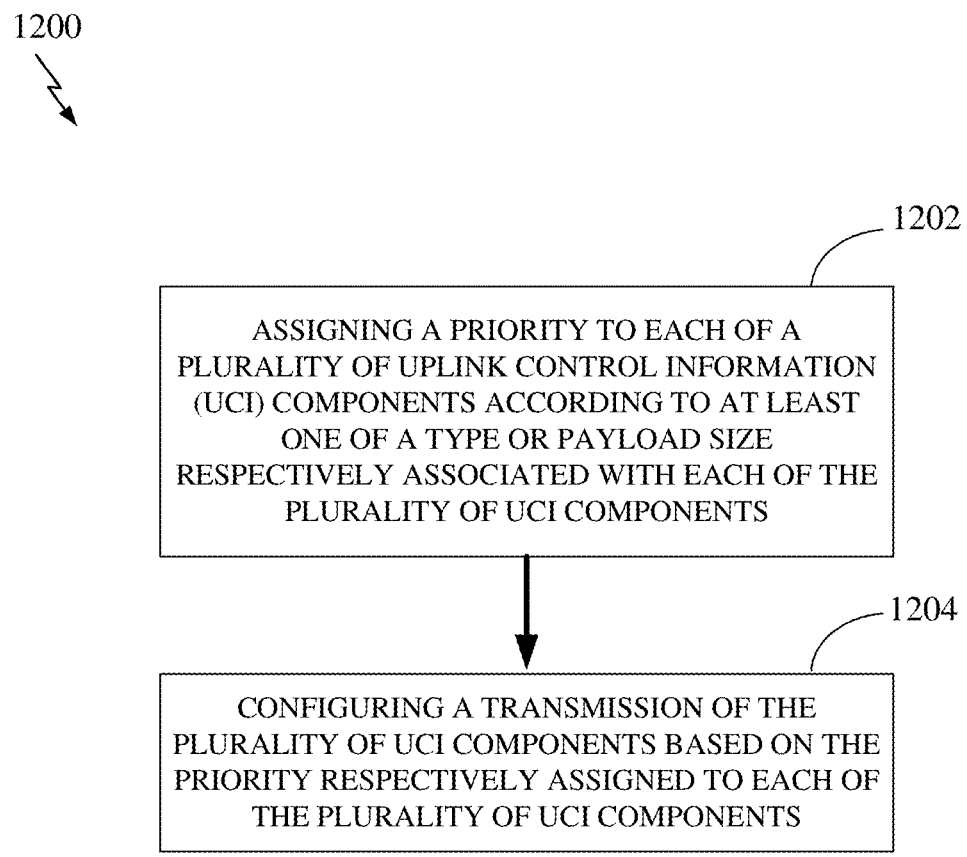
FIG. 12 is a flow chart illustrating an exemplary process for transmitting UCI components in accordance with some aspects of the present disclosure.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described herein, and utilizing, for example, the processes and/or algorithms described in relation to FIG. 12.

Figure 10:
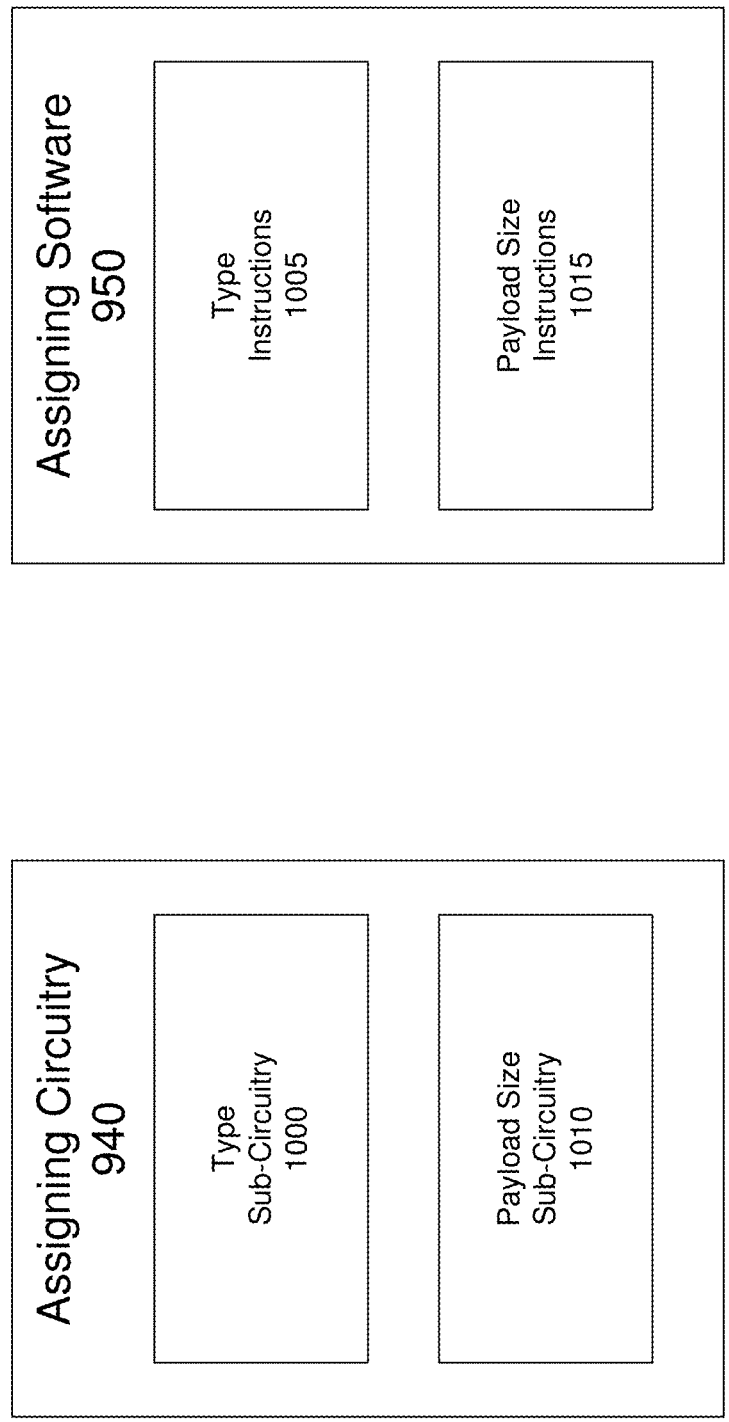
FIG. 10 is a block diagram illustrating a first set of exemplary sub-components corresponding to the scheduled entity illustrated in FIG. 9.

Various other aspects for scheduled entity 900 are also contemplated. For instance, referring next to FIG. 10, exemplary sub-components of assigning circuitry 940 and assigning software 950 are provided. As illustrated, assigning circuitry 940 may comprise type sub-circuitry 1000 and payload size sub-circuitry 1010; whereas assigning software 950 may comprise type instructions 1005 and payload size instructions 1015.

In a particular implementation, it is contemplated that the type sub-circuitry 1000 and/or type instructions 1005 are configured to prioritize the UCI components according to UCI type. To this end, it should be appreciated that the plurality of UCI components may comprise any of various UCI types including, for example, an acknowledgment (ACK) type, a scheduling request (SR) type, and/or a channel state information (CSI) type. Within such implementation, the type sub-circuitry 1000 and/or type instructions 1005 may be configured to assign a higher priority to a first UCI component relative to a second UCI component when the first UCI component is an ACK type or SR type, and the second UCI component is a CSI type.

Although it is contemplated that CSI types will generally be assigned a lower priority than ACK and SR types, it should be noted that various CSI types exist, wherein the type sub-circuitry 1000 and/or type instructions 1005 may be configured to assign each of the various CSI types a different priority. For instance, the types included in the plurality of UCI components may comprise a plurality of CSI types including, for example, a rank indicator (RI) type, a beam information type, a channel quality indicator (CQI) type, and/or a precoding matrix indicator (PMI) type. Within such implementation, the type sub-circuitry 1000 and/or type instructions 1005 may be configured to assign a higher priority to a first UCI component relative to a second UCI component when the first UCI component is an RI type or beam information type, and the second UCI component is a CQI type or PMI type.

In a further aspect of the disclosure, it is contemplated that the payload size sub-circuitry 1010 and/or payload size instructions 1015 are configured to prioritize the UCI components according to UCI payload size. For instance, the payload size sub-circuitry 1010 and/or payload size instructions 1015 may be configured to assign a higher priority to a first UCI component relative to a second UCI component when a payload size of the first UCI component is smaller than a payload size of the second UCI component.

Figure 11:
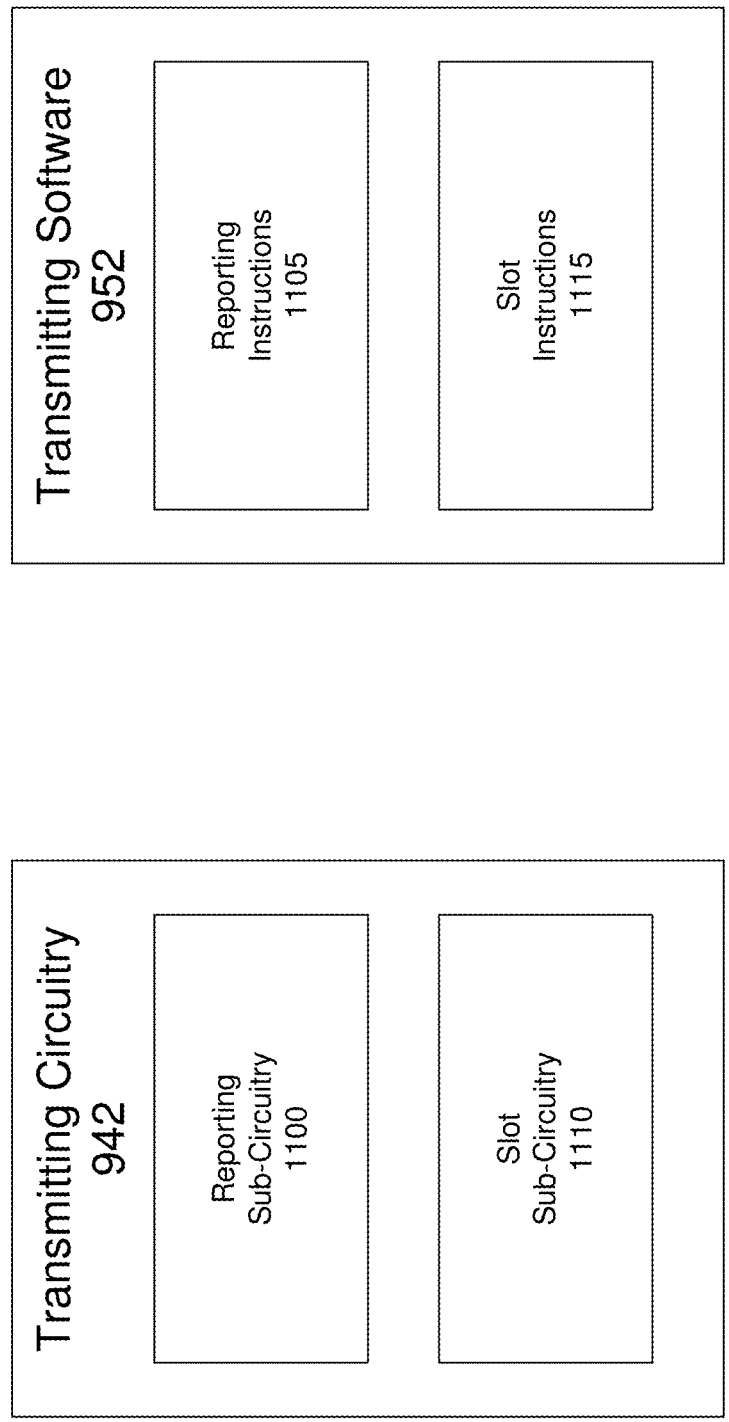
FIG. 11 is a block diagram illustrating a second set of exemplary sub-components corresponding to the scheduled entity illustrated in FIG. 9.

Various other aspects for scheduled entity 900 are also contemplated. For instance, referring next to FIG. 11, exemplary sub-components of transmitting circuitry 942 and transmitting software 952 are provided. As illustrated, transmitting circuitry 942 may comprise reporting sub-circuitry 1100 and slot sub-circuitry 1110; whereas transmitting software 952 may comprise reporting instructions 1105 and slot instructions 1115.

As previously stated, when reporting CSI, payloads may be in the order of a dozen bits per component carrier (CC) for periodic CSI reporting, and in the order of a hundred bits per CC for aperiodic CSI reporting. Other factors that may yield larger payloads include whether a multiple CC scheme is used (e.g., 32 bits per CC in LTE), as well as the particular encoding scheme that is used (e.g., when encoding UCI with polar code, the output bits can be up to 1024 bits). Accordingly, it is contemplated that the reporting sub-circuitry 1100 and/or reporting instructions 1105 may be configured to report a higher number of component carriers when transmitting a higher priority UCI component relative to transmitting a lesser priority UCI component.

In another aspect of the disclosure, it is contemplated that the slot sub-circuitry 1110 and/or slot instructions 1115 may be configured to determine a slot configuration in which the plurality of UCI components are transmitted. For instance, with respect to transmitting large UCI payloads, it is contemplated that the slot sub-circuitry 1110 and/or slot instructions 1115 may be configured to transmit the plurality of UCI components via multiple packets when a size of the plurality of UCI components exceeds a threshold size. In a particular implementation, it is contemplated that slot sub-circuitry 1110 and/or slot instructions 1115 may be configured to transmit the plurality of UCI components via multiple code blocks or in different slots. For example, a large UCI payload may be split into multiple code blocks similar to PUSCH through code segmentation, wherein each code block may be separately encoded with Polar code.

It is also contemplated that the slot sub-circuitry 1110 and/or slot instructions 1115 may be configured to transmit a first UCI component and a second UCI component in a same slot, wherein the first UCI component and the second UCI component are assigned different levels of priority. Within such implementation, various schemes for transmitting UCI components are contemplated.

In an exemplary scheme for transmitting UCI components in a same slot, a power control scheme is contemplated, wherein the slot sub-circuitry 1110 and/or slot instructions 1115 are configured to assign the first UCI component a higher priority than the second UCI component, and wherein the slot sub-circuitry 1110 and/or slot instructions 1115 are configured to transmit the first UCI component with more power than the second UCI component. Here, as previously stated, such design should take into account a transitional period for when a transmission power changes between adjacent symbols. For instance, the slot sub-circuitry 1110 and/or slot instructions 1115 may be configured to configure a transition from higher power to lower power to occur during a transmission of the second UCI component. Alternatively, the slot sub-circuitry 1110 and/or slot instructions 1115 may be configured to configure a first part of a transition from higher power to lower power to occur during a transmission of the first UCI component, and to configure a second part of the transition to occur during a transmission of the second UCI component.

In another exemplary scheme for transmitting UCI components in a same slot, the slot sub-circuitry 1110 and/or slot instructions 1115 may be configured to determine whether the UCI components will be transmitted within an uplink short burst or long burst. For instance, the slot sub-circuitry 1110 and/or slot instructions 1115 may be configured to transmit a first UCI component and a second UCI component in a same long burst. Within such implementation, if the first UCI component is assigned a higher priority than the second UCI component, the slot sub-circuitry 1110 and/or slot instructions 1115 may be configured to allocate more resource elements for a transmission of the first UCI component than for a transmission of the second UCI component. Alternatively, rather than transmitting UCI components in a same long burst, the slot sub-circuitry 1110 and/or slot instructions 1115 may be configured to transmit the first UCI component and the second UCI component in a same short burst. Implementations are also contemplated in which the slot sub-circuitry 1110 and/or slot instructions 1115 may be configured to transmit the first UCI component in a long burst and the second UCI component in a short burst. Further contemplated implementations include having slot sub-circuitry 1110 and/or slot instructions 1115 configured to separately encode the first UCI component and the second UCI component.

As previously stated, in some cases, the assigned resource elements may not be sufficient to transmit an entire UCI payload (i.e., the resulted code rate may be higher than the maximum code rate configured by the gNB). In such cases, it is contemplated that some or all of the UCI payload may be dropped starting from the component with the least priority. For instance, it is contemplated that slot sub-circuitry 1110 and/or slot instructions 1115 may be configured to determine whether resource elements allocated to transmit a plurality of UCI components are sufficient to transmit an entirety of the plurality of UCI components. If the resource elements allocated to transmit the plurality of UCI components are deemed insufficient, slot sub-circuitry 1110 and/or slot instructions 1115 may be configured to drop at least a portion of the plurality of UCI components based on the priority respectively assigned to each of the plurality of UCI components.

Referring next to FIG. 12, a flow chart is provided, which illustrates an exemplary scheduled entity process for performing some aspects of the disclosure. As described below, some or all illustrated features may be omitted in a particular implementation within the scope of the present disclosure, and some illustrated features may not be required for implementation of all embodiments. In some examples, the process 1200 may be carried out by the scheduled entity 900 illustrated in FIG. 9. In some examples, the process 1200 may be carried out by any suitable apparatus or means for carrying out the functions or algorithm described below.

Process 1200 begins at block 1202 with the scheduled entity 900 assigning a priority to each of a plurality of UCI components, wherein the priority is assigned according to at least one of a type or payload size respectively associated with each of the plurality of UCI components. Process 1200 then concludes at block 1204 where the scheduled entity 900 transmits the plurality of UCI components based on the priority respectively assigned to each of the plurality of UCI components.

It should be appreciated that various other aspects of process 1200 are also contemplated. For instance, when assigning a priority at block 1202 according to type, it should be appreciated that the plurality of UCI components may comprise any of various types including, for example, an ACK type, an SR type, and/or a CSI type. Within such implementation, the assigning of priority performed at block 1202 may comprise assigning a higher priority to a first UCI component relative to a second UCI component when the first UCI component is an ACK type or SR type, and the second UCI component is a CSI type.

Although it is contemplated that CSI types will generally be assigned a lower priority than ACK and SR types, it should be noted that various CSI types exist, wherein each of the various CSI types may be assigned a different priority. For instance, the types included in the plurality of UCI components may comprise a plurality of CSI types including, for example, an RI type, a beam information type, a CQI type, and/or a PMI type. Within such implementation, the assigning of priority performed at block 1202 may comprise assigning a higher priority to a first UCI component relative to a second UCI component when the first UCI component is an RI type or beam information type, and the second UCI component is a CQI type or PMI type.

In a further aspect of the disclosure, it is contemplated that the assigning of priority performed at block 1202 may be based on UCI payload size. For instance, the assigning performed at block 1202 may comprise assigning a higher priority to a first UCI component relative to a second UCI component when a payload size of the first UCI component is smaller than a payload size of the second UCI component.

Various aspects of the transmitting performed at block 1204 are also contemplated. For instance, with respect to transmitting large UCI payloads, it is contemplated that the transmitting performed at block 1204 may comprise transmitting the plurality of UCI components via multiple packets when a size of the plurality of UCI components exceeds a threshold size. It is also contemplated that the transmitting performed at block 1204 may comprise reporting a higher number of component carriers when transmitting a higher priority UCI component relative to transmitting a lesser priority UCI component.

Various additional aspects related to the transmitting performed at block 1204 are also contemplated. For instance, in a particular implementation the transmitting comprises transmitting a first UCI component and a second UCI component in a same slot, wherein the first UCI component and the second UCI component are assigned different levels of priority. Within such implementation, various schemes for transmitting UCI components at block 1204 are contemplated.

In an exemplary scheme for transmitting UCI components in a same slot, a power control scheme is contemplated, wherein the first UCI component is assigned a higher priority than the second UCI component, and wherein the transmitting comprises transmitting the first UCI component with more power than the second UCI component. Here, as previously stated, such design should take into account a transitional period for when a transmission power changes between adjacent symbols. For instance, the transmitting performed at block 1204 may comprise configuring a transition from higher power to lower power to occur during a transmission of the second UCI component. Alternatively, the transmitting may comprise configuring a first part of a transition from higher power to lower power to occur during a transmission of the first UCI component, and configuring a second part of the transition to occur during a transmission of the second UCI component.

In another exemplary scheme for transmitting UCI components in a same slot, a determination is made as to whether the UCI components will be transmitted within an uplink short burst or long burst. For instance, the transmitting performed at block 1204 may comprise transmitting a first UCI component and a second UCI component in a same long burst. Within such implementation, if the first UCI component is assigned a higher priority than the second UCI component, the transmitting may comprise allocating more resource elements for a transmission of the first UCI component than for a transmission of the second UCI component. Alternatively, rather than transmitting UCI components in a same long burst, the transmitting performed at block 1204 may comprise transmitting the first UCI component and the second UCI component in a same short burst. Implementations are also contemplated in which the transmitting comprises transmitting the first UCI component in a long burst and the second UCI component in a short burst. Further contemplated implementations include having the transmitting performed at block 1204 include separately encoding the first UCI component and the second UCI component.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Other aspects, features, and embodiments of the present invention will become apparent to those of ordinary skill in the art, upon reviewing the above description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may have been discussed as device, system, or method embodiments it should be understood that such exemplary embodiments can be implemented in various devices, systems, and methods.

What is claimed is:

1. A method of wireless communication operable at a scheduled entity, the method comprising:
   assigning a priority to each of a plurality of uplink control information (UCI) components, wherein the priority is assigned according to a payload size respectively associated with each of the plurality of UCI components; and
   transmitting the plurality of UCI components based on the priority respectively assigned to each of the plurality of UCI components, including transmitting a first UCI component and a second UCI component in a same slot comprising a long burst and a short burst, the first UCI component being assigned a higher priority than the second UCI component, and wherein more resource elements are assigned for transmitting the first UCI component than for transmitting the second UCI component.

2. The method of claim 1, wherein the plurality of UCI components comprise at least one of an acknowledgment (ACK) type, a scheduling request (SR) type, or a channel state information (CSI) type.

3. The method of claim 2, wherein:
   the first UCI component is an ACK type or SR type; and
   the second UCI component is a CSI type.

4. The method of claim 1, wherein the plurality of UCI components comprise a plurality of channel state information (CSI) types, and wherein the plurality of CSI types comprise at least one of a rank indicator (RI) type, a beam information type, a channel quality indicator (CQI) type, or a precoding matrix indicator (PMI) type.

5. The method of claim 4, wherein:
   the first UCI component is an RI type or beam information type; and
   the second UCI component is a CQI type or PMI type.

6. The method of claim 1, wherein a payload size of the first UCI component is smaller than a payload size of the second UCI component.

7. The method of claim 1, wherein the transmitting comprises transmitting the plurality of UCI components via multiple packets when a size of the plurality of UCI components exceeds a threshold size.

8. The method of claim 1, wherein the transmitting comprises reporting a higher number of component carriers when transmitting a higher priority UCI component relative to transmitting a lesser priority UCI component.

9. The method of claim 1, wherein the transmitting comprises transmitting the first UCI component with more power than the second UCI component.

10. The method of claim 9, wherein the transmitting further comprises configuring a transition from higher power to lower power to occur during a transmission of the second UCI component.

11. The method of claim 9, wherein the transmitting further comprises:
    configuring a first part of a transition from higher power to lower power to occur during a transmission of the first UCI component; and
    configuring a second part of the transition to occur during a transmission of the second UCI component.

12. The method of claim 11, wherein the transmitting further comprises:
    determining whether resource elements allocated to transmit the plurality of UCI components are sufficient to transmit an entirety of the plurality of UCI components; and
    if the resource elements allocated to transmit the plurality of UCI components are deemed insufficient, dropping at least a portion of the plurality of UCI components based on the priority respectively assigned to each of the plurality of UCI components.

13. The method of claim 1, wherein the transmitting comprises transmitting the first UCI component and the second UCI component in the long burst.

14. The method of claim 13, further comprising separately encoding the first UCI component and the second UCI component.

15. The method of claim 1, wherein the transmitting comprises transmitting the first UCI component and the second UCI component in the short burst.

16. The method of claim 1, wherein the transmitting comprises transmitting the first UCI component in the long burst and the second UCI component in the short burst.

17. A scheduled entity for wireless communication comprising:
    a transceiver;
    memory; and
    a processor coupled to the transceiver and the memory, and wherein the processor and memory are configured to:
    assign a priority to each of a plurality of uplink control information (UCI) components, wherein the priority is assigned according to a payload size respectively associated with each of the plurality of UCI components; and initiate transmission, via the transceiver, of the plurality of UCI components based on the priority respectively assigned to each of the plurality of UCI components, including initiating transmission of a first UCI component and a second UCI component in a same slot comprising a long burst and a short burst, the first UCI component being assigned a higher priority than the second UCI component, and wherein more resource elements are assigned for use in transmitting the first UCI component than are assigned for use in transmitting the second UCI component.

18. The scheduled entity of claim 17, wherein the plurality of UCI components comprise at least one of an acknowledgment (ACK) type, a scheduling request (SR) type, or a channel state information (CSI) type.

19. The scheduled entity of claim 18, wherein:
the first UCI component is an ACK type or SR type; and
the second UCI component is a CSI type.

20. The scheduled entity of claim 17, wherein the plurality of UCI components include a plurality of channel state information (CSI) types comprising at least one of a rank indicator (RI) type, a beam information type, a channel quality indicator (CQI) type, or a precoding matrix indicator (PMI) type.

21. The scheduled entity of claim 20, wherein:
the first UCI component is an RI type or beam information type; and
the second UCI component is a CQI type or PMI type.

22. The scheduled entity of claim 17, wherein the processor and memory are further configured to prioritize the UCI components according to UCI payload size, and wherein a payload size of the first UCI component is smaller than a payload size of the second UCI component.

23. The scheduled entity of claim 17, wherein the processor and memory are further configured to determine a slot configuration in which the plurality of UCI components are transmitted via multiple packets when a size of the plurality of UCI components exceeds a threshold size.

24. The scheduled entity of claim 17, wherein the processor and memory are further configured to report a higher number of component carriers for transmission of a higher priority UCI component relative to transmission of a lesser priority UCI component.

25. The scheduled entity of claim 17, wherein the transceiver is configured to transmit the first UCI component with more power than the second UCI component.

26. The scheduled entity of claim 25, wherein the transceiver is configured to transition from a higher power to a lower power during transmission of the second UCI component.

27. The scheduled entity of claim 25, wherein the transceiver is configured to:
perform a first part of a transition from the higher power to the lower power during transmission of the first UCI component; and
perform a second part of the transition during transmission of the second UCI component.

28. The scheduled entity of claim 27, wherein the processor and memory are further configured to:

determine whether resource elements allocated to transmit the plurality of UCI components are sufficient to transmit an entirety of the plurality of UCI components; and
if the resource elements allocated to transmit the plurality of UCI components are deemed insufficient, drop at least a portion of the plurality of UCI components based on the priority respectively assigned to each of the plurality of UCI components.

29. The scheduled entity of claim 17, wherein the transceiver is configured to transmit the first UCI component and the second UCI component in the long burst.

30. The scheduled entity of claim 29, wherein the transceiver is further configured to separately encode the first UCI component and the second UCI component.

31. The scheduled entity of claim 17, wherein the transceiver is configured to transmit the first UCI component and the second UCI component in the short burst.

32. The scheduled entity of claim 17, wherein the transceiver is configured to transmit the first UCI component in the long burst and the second UCI component in the short burst.

33. An article of manufacture comprising a non-transitory computer readable medium storing computer executable code comprising instructions for causing a processor to:
assign a priority to each of a plurality of uplink control information (UCI) components, wherein the priority is assigned according to a payload size respectively associated with each of the plurality of UCI components; and
initiate transmission of the plurality of UCI components based on the priority respectively assigned to each of the plurality of UCI components, including transmission of a first UCI component and a second UCI component in a same slot comprising a long burst and a short burst, the first UCI component being assigned a higher priority than the second UCI component, and wherein more resource elements are assigned for transmitting the first UCI component than for transmitting the second UCI component.

34. A wireless communication device comprising:
means for assigning a priority to each of a plurality of uplink control information (UCI) components, wherein the priority is assigned according to a payload size respectively associated with each of the plurality of UCI components; and
means for transmitting the plurality of UCI components based on the priority respectively assigned to each of the plurality of UCI components, including means for transmitting a first UCI component and a second UCI component in a same slot comprising a long burst and a short burst, the first UCI component being assigned a higher priority than the second UCI component, and wherein more resource elements are assigned for transmitting the first UCI component than for transmitting the second UCI component.

* * * * *